Patented May 16, 1939

2,158,511

UNITED STATES PATENT OFFICE 2,158,511

METHOD FOR THE PRODUCTION OF CAST IRON IN CUPOLA FURNACES

Karl Lauer, Gelsenkirchen, Germany, assignor to Deutsche Eisenwerke Aktiengesellschaft, Mulheim-on-the-Ruhr, Germany, a body corporate No Drawing. Application June 17, 1938, Serial No. 214,317. In Germany June 21, 1937

7 Claims. (Cl. 75—43)

It is known, to produce superheated cast iron meltings with low carbon content and consequently a high-grade cast iron in cupola furnaces by adding to the iron charge more or less large quantities of steel scrap or of other iron poor in carbon and in melting these charges only with the quantities of coke usual for the remelting of pig iron or pig iron and broken cast iron and with the quantities of air corresponding to this quantity of coke. The steel scrap or iron poor in carbon is, in this method, charged with the iron charge as a component of this charge and as far as possible in relatively coarse and large cross-sectional lumps adapted to the diameter of the furnace.

It has also been tried to employ the steel scrap in the form of steel chips as a component for the charge, and proposals of this kind are to be found in literature. For this purpose the steel chips are introduced into the melting zone of the furnace either in compressed state produced by means of an eccentric press or are charged with the iron charge into the furnace, pressed as tightly as possible into suitable sheet iron containers or briquetted into a compact shape with or without binding agent, an increase of the quantity of charge coke being mostly considered to be necessary. In all these remelting methods of steel chips, however, a considerable loss of iron cannot be avoided.

The inventor has now discovered that, entirely contrary to all former opinions and general practice, the heat liberated during the burning of steel can be utilized in an excellent manner for the smelting process in the cupola furnace if steel or other iron poor in carbon is, according to the present invention, charged into the furnace as additional heat carrier in the form of steel wool or in similar large surface, small cross-sectional, bulky form and in the loosest possible state, together with the charge coke i. e. the quantity of coke to be used in the furnace for each iron charge, and mixed therewith. Whereas, in the known method using steel addition to the charge, the steel addition is intended, on the one hand, to produce a high melting and consequently high running temperature and, on the other hand, to reduce the carbon content and to thereby produce high grade properties in the castings, in the method according to the invention the quantity of the steel wool or the like to be added in loose state must be so chosen that its loss only results in an increase of the melting temperature without appreciably influencing the analysis of the molten iron according to the iron charge.

When a low carbon content is not desired or desirable, it was hitherto not possible to attain such high melting and running temperatures as in the case of charges containing steel, because in these instances essential steel additions to the charges had to be avoided. In these cases is given an exceedingly important application for the invention, in that the inventor has unexpectedly discovered that in the cupola furnace a soft, that is normal or highly carbonized cast iron with high temperature can also be melted if steel or other iron, poor in carbon, is added to the quantity of coke usual for remelting pig iron or pig iron and broken cast iron, in the form of wool or in similar large surface and small cross-sectional form. This iron poor in carbon added preferably mixed with the charge coke in the loosest possible state quickly attains very high temperatures under the action of the glowing coke and burns in the melting zone under the action of the oxygen of the blast thereby developing high specific heat, with the result that it is utilized in an excellent manner for increasing the temperature or for superheating the actual iron charge, without thereby influencing in an unfavourable manner the softness or the carbon content of the product.

For attaining a noticeable effect quantities of steel wool or the like amounting to 5% of the charge coke weight are already sufficient; however, it is also possible to add to the usual quantity of charge coke steel wool or the like up to 30% and more of the weight of the charge coke.

Wastes of other easily oxidizable metals, such as aluminium or the like, can also be used instead of or together with steel wool or other large surface, small cross-sectional bulky iron wastes in loose form.

If the cupola furnace is already normally operated with considerable excess draft, this quantity of air hitherto used is generally sufficient for the new method; if necessary, it is advisable to increase the quantity or pressure of the air or both so as to have at disposal the oxygen necessary for the burning of the steel wool or the like.

The advantage of the new method in the production of cast iron from pig iron and broken cast iron is that—without the desired quality and properties of the cast iron being influenced by the steel wool or similar addition—a very hot, thinly liquid yet soft, that is normally high or highly carbonized iron can be produced, which in many cases is of great advantage and particularly important, for example in the production of radiator castings, sewing machine castings or the like.

It is also possible to use the new method on iron charges which contain more or less coarse steel as a charge component.

I claim:

1. A method for the production of cast iron in cupola furnaces, consisting in charging an easily oxidizable metal of large-surface and small cross-sectional form in the loosest possible state as additional heat generating means mixed with that quantity of charge coke, which is normally used for the remelting of pig iron or pig iron and broken cast iron.

2. A method as specified in claim 1, in which iron poor in carbon is used as easily oxidizable metal.

3. A method as specified in claim 1, in which steel wool is used as easily oxidizable metal.

4. A method as specified in claim 1, in which for the production of normal or higher carbonized cast iron the quantities of easily oxidizable metals charged into the furnace mixed with the charge coke are selected so that their burning only increases the melting temperature without essentially influencing the carbon content of the molten iron.

5. A method as specified in claim 1, in which iron poor in carbon is used as easily oxidizable metal and is mixed with the coke in a quantity of from 5% to 30% of the weight of the charge coke.

6. A method as specified in claim 1, in which a mixture of steel wool and aluminium is used as easily oxidizable metal.

7. A method as specified in claim 1, in which a mixture of iron poor in carbon and aluminium is used as easily oxidizable metal.

KARL LAUER.